United States Patent [19]

Eberlein et al.

[11] Patent Number: 5,706,309
[45] Date of Patent: Jan. 6, 1998

[54] PROCESS FOR TRANSMITTING AND/OR STORING DIGITAL SIGNALS OF MULTIPLE CHANNELS

[75] Inventors: Ernst Eberlein, Grossenseebach; Jürgen Herre, Buckenhof; Bernhard Grill, Radnitzhembach; Karl-Heinz Brandenburg; Dieter Seitzer, both of Erlangen, all of Germany

[73] Assignee: Fraunhofer Geselleschaft zur Forderung der angewandten Forschung e.v., Munich, Germany

[21] Appl. No.: 428,235

[22] PCT Filed: Nov. 2, 1993

[86] PCT No.: PCT/DE93/01047

§ 371 Date: May 2, 1995

§ 102(e) Date: May 2, 1995

[87] PCT Pub. No.: WO94/10758

PCT Pub. Date: May 11, 1994

[30] Foreign Application Priority Data

Nov. 2, 1992 [DE] Germany ............ 42 36 989.4

[51] Int. Cl.⁶ ................................................. H04B 1/66
[52] U.S. Cl. ................................................. 375/260
[58] Field of Search ............................. 375/240, 260; 348/398, 384 T; 395/2.1, 2.12; 381/29, 30, 36, 37

[56] References Cited

U.S. PATENT DOCUMENTS

| | | | |
|---|---|---|---|
| 4,170,719 | 10/1979 | Fujimura | 395/2.17 |
| 5,371,544 | 12/1994 | Jacquin et al. | 348/398 |
| 5,400,433 | 3/1995 | Davis et al. | 395/2.29 |

FOREIGN PATENT DOCUMENTS

| | | | |
|---|---|---|---|
| 0176243 | 4/1986 | European Pat. Off. | H04B 1/66 |
| 0289080 | 11/1988 | European Pat. Off. | H04B 1/66 |
| 8908357 | 9/1989 | WIPO | H04B 14/04 |
| 9009064 | 8/1990 | WIPO | H04B 1/66 |

*Primary Examiner*—Stephen Chin
*Assistant Examiner*—Kevin Kim
*Attorney, Agent, or Firm*—Antonelli, Terry, Stout, & Kraus, LLP

[57] ABSTRACT

A process for transmitting and/or storing digital signals of multiple channels. This process is suited, in particular, for transmitting the five channels of 3/2 stereophony as well as for transmitting two stereo channels and three additional commentary channels. In this manner, by way of illustration, television programs with multi-language audio signals can be transmitted. This process is distinguished in that by reduction of the to-be-transmitted data, only a bit rate of 384 kbit/s is required for transmission. The reduction of the data is achieved by the K input channels being imaged in segments onto the $N \leq K$ virtual spectral data channels, by the spectral data channels being quantized, coded, and transmitted taking into consideration the principles of psychoacoustics, and by K output channels being reproduced from the transmitted bit stream with the aid of a transmitted list from the $N \leq K$ spectral data channels.

11 Claims, 2 Drawing Sheets

PROCESS FOR TRANSMITTING AND/OR STORING DIGITAL SIGNALS OF MULTIPLE CHANNELS

BACKGROUND OF THE INVENTION

1. Field of the Invention

The present invention relates to a process for transmitting and/or storing digital signals of multiple channels according to the introductory part of claim 1.

2. Description of Related Art

Process in which digital signals, in particular audio signals, are transmitted frequency-coded are known, by way of illustration, from the PCT publications WO 88/01811 and WO 89/08357.

For one-channel and two-channel transmission, the standardization committee, Moving Pictures Experts Group (MPEG), of the International Standardization Organization (ISO) set the standard ISO-11172-3 for coding and the to-be-transmitted bit stream of audio signals.

Psychoacoustic models which permit reducing the amount of to-be-transmitted data while exploiting the properties of human hearing with minimal quality loss are used in the mentioned coding process.

For explanation of all terms not made more apparent herein reference is explicitly made to the publications and the standard.

In further developing international standards, work is presently being done, among other things, in reducing the data in multi-channel transmission. The scientific publication "MUSICAM-Surround: A Universal Multi-Channel Coding System Compatible with ISO 11172-3", 93rd AES convention, 1992, San Francisco, proposes a process for transmitting of up to 5 channels. By way of illustration, two stereo channels and one center channel as well as two side channels (3/2 stereophony) or two stereo channels and three commentary channels can be transmitted.

Further data reduction is achieved in that parts of the stereo signals, which are insignificant with regard to spatial perception, are transmitted in only one channel. In addition transmitted are scale factors, which represent a measure of the intensity of the signals conducted from the mono-channel to the corresponding loudspeakers. With this process, artefacts with lower audio pleasure are generated especially in the lower frequency range.

In addition to this, it has been proposed to reduce the to-be-transmitted amount of data by not determining a so-called intra-channel masking threshold for each channel for the coding, but rather by providing a common threshold for all the channels, taking into consideration the intra-channel masking effect. However, the use of a common masking threshold results in that interfering coding noises may be perceptible in the vicinity of a loudspeaker.

SUMMARY OF THE INVENTION

The object of the present invention is to provide a process for transmitting and/or storing digital signals of multiple channels permitting further reduction of the amount of to-be-transmitted data and resulting in no subjectively perceptible disturbance of transmitted signals.

This object is solved by a process with the features of claim 1.

According to the present invention, the signals of the different channels are first converted into spectral values. Subsequently, using the spectral values of the corresponding segments of the different channels it is determined in which channels similar spectral portions occur.

Investigated is whether in combining the segments from the different channels, the interferences caused by the joint coding are below the audibility threshold or if artefacts are generated. If no artefacts are expected, combination is permitted. In this manner, the K input channels are imaged in segments on the spectral data channels (transmitted spectral channels). The more different the original input channels are, the more different spectral data channels have to be used in order to transmit the signal information. If, in an extreme case, all the channels in a segment are practically the same, a single spectral data channel may suffice, in particular for the upper part of the spectrum. The amplitudes of the spectral segments can be controlled by means of the respective scale factors.

The number of NTSC (number of transmitted spectral channels) of the required spectral data channels is variable and may be less than or at most the same number K of the input and output channels.

In order to be able to control the combination of the K-output channels from the NTSC spectral data channels in the decoder, a list of information data (SEGMENT_DATA) is transmitted in addition to the (reduced) signal data. This list describes how the spectral values of the output channels are combined from the sides of the spectral data channels.

Advantageous embodiments and further developments of the present invention are set forth in the subclaims.

According to claim 2, the control commands required to reconstruct a segment of an output channel are combined into an information block (SEGMENT_INFO). This block contains fields for the length of the segment (SEG_LENGTH), for the selection of the spectral data channels (TSC_SELECT) and for the scale factors (scf). The coded spectral data (TSC_DATA) of a specific spectral data channel (TSC_NUM) are decoded in the decoder with the respective scale factors (sfc) determining the reconstruction matrix.

The information for reconstructing the segments of an output signal are, according to claim 3, lined up to form a list (SEGMENT_LIST).

According to claim 4, the lists of segments of the individual output channels form the global list (SEGMENT_DATA). Thus, the lists for a left channel (LEFT_CHANNEL), a right channel (RIGHT_CHANNEL), a center channel (CENTER_CHANNEL) and further channels are listed in the global list.

According to an advantageous embodiment of the present invention, as set forth in claim 5, the channels form a multi-channel tone. By way of illustration, the 5 channels of the 3/2 stereophony are transmitted. In addition to the two stereo channels, a center channel, a left side channel (LS_CHANNEL) and a right side channel (RS_CHANNEL) are transmitted. The transmitted channels are given following reverse transformation into the time domain to the corresponding five loudspeakers of 3/2 stereophony.

In another embodiment as set forth in claim 6, in addition to the conventional two stereo channels, several additional commentary channels are transmitted. In these channels, by way of illustration, in HDTV (high definition television) the audio signals can be transmitted in different languages. The viewer can then select the desired language for the given television picture. The language can be dynamically added to the two stereo channels.

According to claim 7, the transmission of the spectral data channels occurs with a process that is compatible with the standard ISO 11172-3. All three layers of this standard can form the basis of the transmission of the spectral data channels.

According to claim 8, during coding, groups of spectral values which are scaled by means of a common scale factor, thus belong to a scale factor band, are not transmitted if this scale factor band is not required in any information block (SEGMENT_INFO). In this event, the respective spectral values are not needed for reconstructing the output channels. Advantageous is if the fixed scale-band division of the ISO standard is utilized.

The signalization of the unused scale factor bands occurs implicitly according to claim 9, that means that no additional information has to be transmitted to this signalization.

According to claim 10, linear combinations of the to-be-transmitted channels can also be formed with the inventive process. This leads to a further reduction of the amount of data if the spectral values strongly resemble each other in the individual channels. The signals of the output channels are formed in this event by linear combinations of the reconstructed spectral values.

According to claim 11, the bit rate required for transmitting the coded data from all the channels does not exceed 384 kbit/s. In this way, the demands made on the maximum bit rate of layer III of the ISO standard are met.

The essential advantages of the present invention lie in that a distinct reduction of the to-be-transmitted amount of data is achieved by the imaging of the input channels on a small number of virtual spectral channels without any audible loss in quality. In this way, the audio signals are transmitted with especially high spatial resolution. This is of particular advantage in large rooms containing a large audience.

In addition, several channels can be made available to the individual users from which they can select the desired information. By way of illustration, the audio channels can be transmitted simultaneously for a television program in several languages of which the viewer can select the desired one.

The technically more complicated process steps for realizing the process are undertaken in the encoder providing the to-be-transmitted bit stream. The decoder only processes the information of the arriving bit stream successively and is constructed substantially simpler than the encoder. The inventive process, therefore, requires a higher degree of complexity in the few encoders whereas the decoders required in greater numbers for the user hardly increase in complexity.

DESCRIPTION OF THE PREFERRED EMBODIMENTS

The present invention is made more apparent in the following using a preferred embodiment.

Figure 1:
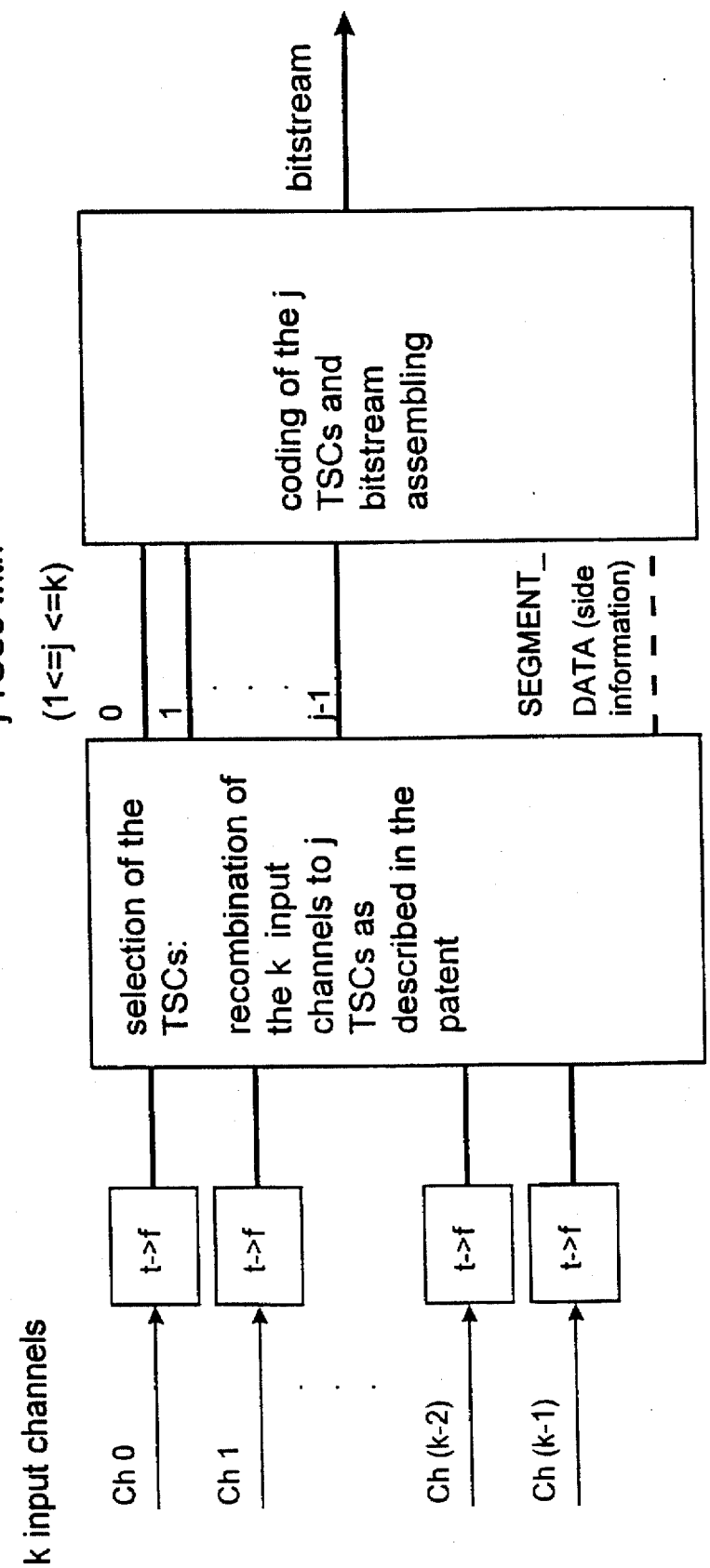
FIG. 1 shows an example of an encoder for use in performing a process for transmitting and/or storing digital signals of multiple channels according to the present invention.
Figure 2:
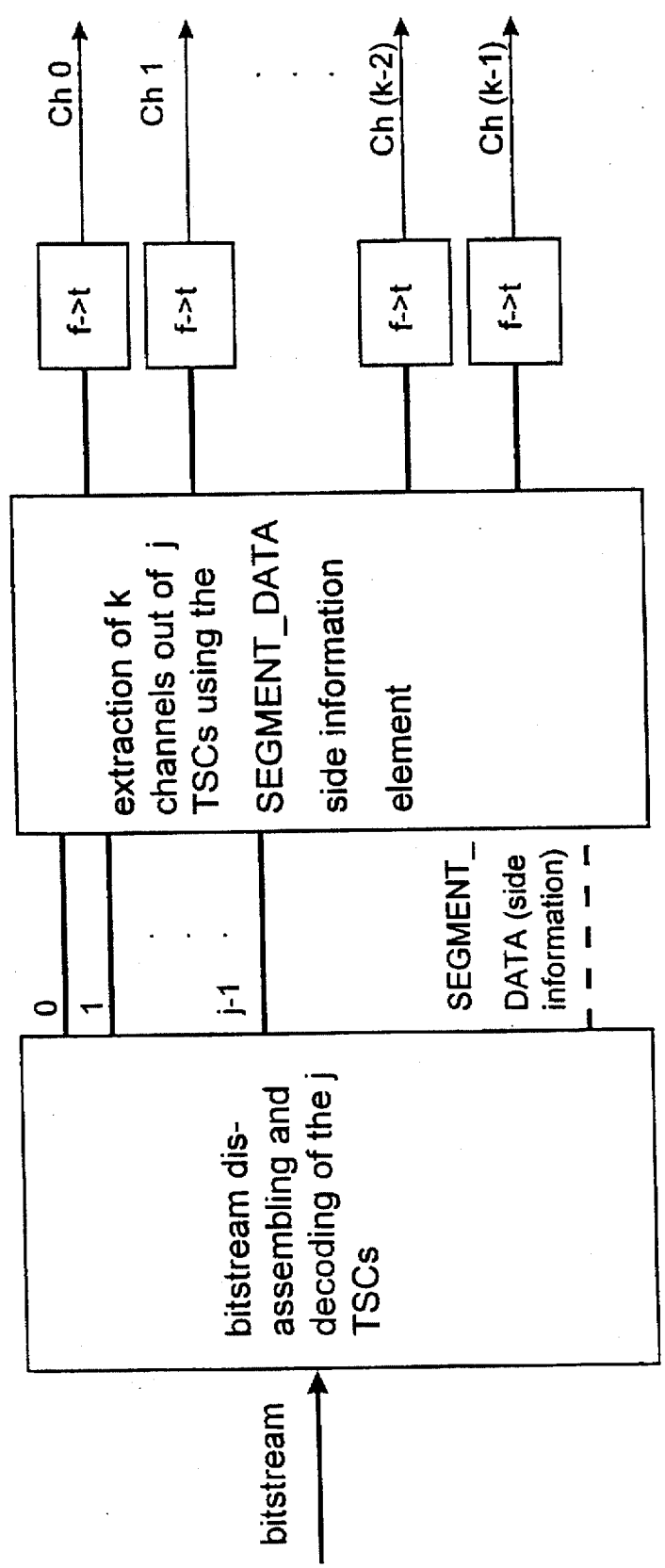
FIG. 2 shows an example of a decoder for use in performing a process for transmitting and/or storing digital signals of multiple channels according to the present invention.

FIG. 1 shows an example of an encoder for use in implementing the preferred embodiment, and FIG. 2 shows an example of a decoder for use in implementing the preferred embodiment.

The preferred embodiment is based on the standard ISO 11172-3 of the Moving Pictures Expert Group (MPEG) of the International Organization for Standardization. This standard is referred to hereinafter as MPEG-1. The concept is restricted to layer III of the standard without the intention of limiting the overall inventive idea. Like in standard MPEG-1/ layer III, mathematical operations are used similar to the programming language C.

With the aid of filter banks, the signals of the 5 input channels from the time domain are imaged in the frequency domain, in subbands (Sb), the input signals being decomposed into undersampled spectral values.

Exploiting the regularities known in psychoacoustics, a computation is made as to which segments of the different channels can be combined without generating artefacts that lie above the audibility threshold.

The frequency value of the input channels are quantized and coded individually or as linear combinations. This occurs on the condition that the errors resulting from the quantization lie below the audibility threshold.

Subsequently, the to-be-transmitted bit stream is combined. It contains the quantized and coded frequency values of the spectral data channels as well as supplementary information. These consist of scale factors, bit allocation, information of the tables and other parameters used in the current block and the lists indicating how the decoded frequency values of the spectral data channels are combined for reconstructing the output channels.

These lists are attached to the bit stream according to MPEG>1 as supplementary information.

This extension (MPEG2_extension_data) is displayed in the following:

MPEG2_extension_data()

signalling_byte ():

NTSC; ; 3 bit uimsbf

SEGMENT_DATA ();

for (i=3; i<=NTSC; i++) ; first two channels

TSC_DATA (i);

The term signalling_byte indicates how many and which input respectively output channels are employed. It determines whether a mono channel, stereo channel, a center channel or auxiliary channels, etc., are transmitted.

NTSC indicates the number of required spectral data channels.

SEGMENT_DATA describes the list for the reconstructing of the output channels and contains the lists for the reconstructions of the individual channels (SEGMENT_LIST).

SEGMENT_DATA ()

for (i=0; i<NTSC; i++, reset used_sb-map for (sb=0; sb<21; sb++)

used_sb-map i sb =0;

SEGMENT_LIST(LEFT_CHANNEL);

SEGMENT_LIST(RIGHT_CHANNEL);

if (center_on)

SEGMENT_LIST(CENTER_CHANNEL);

if (stereo_surround) ; stereo surround

SEGMENT_LIST(LS_CHANNEL);

SEGMENT_LIST(RS_CHANNEL);

if (mono_surround) ; mono surround

SEGMENT_LIST(MS_CHANNEL);

for (i=0; i<no_of_commentary_chan; i++)

SEGMENT_LIST(COM_CHANNEL i );

The function used_sb_map indicates whether a scale factor band which contains the spectral values of a spectral data channel which is scaled by a common scale factor is used. If such a scale factor band is not employed by any information block (SEGMENT_INFO), the corresponding spectral values are not transmitted.

The list for reconstruction of a specific channel (SEGMENT_LIST) contains information about the segment length(SEG_LENGTH), the size of the scale factors scalefac_size), the scale factors (scf) and the selection of the spectral data channel (TSC_SELECT).

```
SEGMENT_LIST ()
sb=0;
for (i=0; 1; i++)
    SEG_LENGTH i ; ; 4 bit uimsbf
    if (SEG_LENGTH i ==0) break;
    TSC_SELECT i ; 3 bit uimsbf
    if (SEG_LENGTH i ==15)
        sign =+1; len =SEG_LENGTH i-1;
    else if (SEG_LENGTH i ==14)
        sign =-1; len=SEG_LENGTH i-1;
    else
        sign =0; len =SEG_LENGTH i;
    if (TSC_SELECT i ; =0)
        scalefac_size; ; 4 bit, bslbf
        for (l=0; 1<len; 1++)
            scf i sb+1; ; 0 . . . 4 bits
            used_sb_map TSC_SELECT
            sb+1=1; ; mark uses SBs
    if (!sign) sb +=len;
```

In the preferred embodiment, the values 14 and 15 are reserved for forming the linear combinations of reconstructed spectral values. In the case of SEG_LENGTH ==15, is added and in the case of SEG_LENGTH ==14, is substracted.

The bit stream for the data from the spectral data channel corresponds to the bit stream of the main data in the case MPEG-1/layer III and reads:

```
TSC_DATA(TSC_NUM)
    part2_3_length; ; see MPEG-1/audio
    scalefac_compress;
    global_gain;
    block_type;
    big_values;
    table_select 3 ;
    count1table_select;
    region_count 2 ;
    for (sb=0; sb<21>; sb++)
        if (used_sb_map TSC_NUM sb)
            Huffmancodesection TSC_NUM sb;
```

The used symbols stand for:

| | |
|---|---|
| ++ | increase |
| == | same |
| = | allocation operator |
| ! | logical not |
| bslbf | bit string, left bit first |
| ch | channel |
| sb | subband |
| uimsbf | unsigned integer, most significant bit first |

What is claimed is:

1. A process for transmitting and/or storing digital signals from K input channels, in which
   sampling values of signals from the time domain are transmitted in blocks into the frequency domain (in spectral values), and
   said spectral values are coded and combined into a bit stream which is transmitted and/or stored and subsequently decoded and transmitted back into K output channels in the time domain,
   wherein a variable number of spectral data channels (TSC, transmitted spectral data) are formed in segments during the coding in dependence of the spectral information of the blocks of the individual input channels, with the number of NTSC (number of transmitted spectral channels) of the spectral data channels per segment being less than or the same as the number K of the input and output channels, said number of NTSC and the structure of said spectral data channels being included in the bit stream as information (SEGMENT_DATA) and following transmission of said bit stream, said K output channels are combined in the decoder in segments from the transmitted spectral data channels (TSC) with the aid of the information (SEGMENT_DATA).

2. A process according to claim 1, wherein the information for reconstruction of a segment of an output channels is combined into an information block (SEGMENT_INFO) composed of a field for the length of the segment (SEG_LENGTH), a field for the selection of the required spectral data channel (TSC_SELECT), and a field for a set of scale factors (SCF) which determine in said decoder the reconstruction of the amplitude of the coded spectral values of said spectral data channel (TSC_DATA).

3. A process according to claim 1 or 2, wherein, for reconstructing a specific output channel from said spectral values of said spectral data channel (TSC_DATA), the information of the segments (SEGMENT_INFO) is lined up to form a list (SEGMENT_LIST).

4. A process according to claim 1 or 2, wherein, for reconstructing said K output channels from said spectral values of said spectral data channels, the information for reconstructing the individual output channels (SEGMENT_LIST) is lined up to form a list (SEGMENT_DATA).

5. A process according to claim 1 or 2, wherein said input and output channels form a multi-channel tone.

6. A process according to claim 1 or 2, wherein said input and output channels form a stereo channel pair and other additional commentary channels.

7. A process according to claim 1 or 2, wherein said spectral data channels (TSC) are coded and transmitted by means of a process which is compatible with the standard ISO 11172-3 of the International Organization for Standardization, Coding of Moving Pictures and Associated Audio.

8. A process according to claim 1 or 2, wherein, in said coding of spectral values, a coding is utilized in which groups of spectral values scaled by a common scale factor are combined (scale factor band) and spectral values belonging to scale factor bands not used in any information block (SEGMENT_INFO) are not transmitted.

9. A process according to claim 8, wherein the signalization of the unused scale factor bands occurs implicitly.

10. A process according to claim 1 or 2, wherein said coding of said input channels and the imaging of said input channels onto said spectral data channels (TSC) occurs in such a manner that for reconstructing said output channels, linear combinations of reconstructed spectral values are formed from different spectral data channels.

11. A process according to claim 1 or 2, wherein the bit rate for transmitting the coded data of all channels does not exceed 384 kbit/s.

* * * * *